United States Patent
Randolph et al.

(10) Patent No.: US 8,941,643 B1
(45) Date of Patent: Jan. 27, 2015

(54) QUALITY ASSURANCE TESTING OF VIRTUAL ENVIRONMENTS

(75) Inventors: Jeremy Randolph, San Bruno, CA (US); Matthew Bishop, San Francisco, CA (US); Tzuen Wu, Los Angeles, CA (US); Eric R. Johnston, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 748 days.

(21) Appl. No.: 12/979,881

(22) Filed: Dec. 28, 2010

(51) Int. Cl.
  *G06G 7/48* (2006.01)
  *G06T 15/30* (2011.01)

(52) U.S. Cl.
  USPC ............ 345/419; 345/420; 345/520; 355/67; 714/57; 714/46; 703/6

(58) Field of Classification Search
  None
  See application file for complete search history.

(56) References Cited

U.S. PATENT DOCUMENTS

| | | | | |
|---|---|---|---|---|
| 2003/0214630 | A1* | 11/2003 | Winterbotham | 351/203 |
| 2004/0243364 | A1* | 12/2004 | Wendelin et al. | 703/2 |
| 2005/0237328 | A1* | 10/2005 | Guhring | 345/520 |
| 2007/0216683 | A1* | 9/2007 | Navratil et al. | 345/440 |
| 2007/0260943 | A1* | 11/2007 | Haskell | 714/57 |
| 2008/0132174 | A1* | 6/2008 | Corral et al. | 455/67.16 |
| 2009/0067290 | A1* | 3/2009 | Londo et al. | 367/89 |
| 2009/0083015 | A1* | 3/2009 | McDaniel | 703/6 |

OTHER PUBLICATIONS

Bukowski, Richard W., and Carlo H. Séquin. "Object associations: a simple and practical approach to virtual 3D manipulation." Proceedings of the 1995 symposium on Interactive 3D graphics. ACM, 1995.*
Frueh, Christian, and Avideh Zakhor. "Constructing 3d city models by merging ground-based and airborne views." Computer Vision and Pattern Recognition, 2003. Proceedings. 2003 IEEE Computer Society Conference on. vol. 2. IEEE, 2003.*
Nooruddin, Fakir S., and Greg Turk. "Simplification and repair of polygonal models using volumetric techniques." Visualization and Computer Graphics, IEEE Transactions on 9.2 (2003): 191-205.*
S.M. Morvan and G.M. Fadel, "IVECS: An Interactive Virtual Environment for the Correction of .STL files," Proc. Conf. Virtual Design, Aug. 1996.*
"Brútal Legend," Wikipedia, accessed on-line http://en.wikipedia.org/wiki/Br%C3%BCtal_Legend, retrieved Oct. 25, 2010, 21 pages.
Esmurdoc, Caroline. "Postmortem: Double Fine's *Brutal Legend*," accessed online http://www.gamasutra.com/view/feature/4308/postmortem_double_fines_brutal , retrieved Oct. 25, 2010, 12 pages.

* cited by examiner

*Primary Examiner* — Ulka Chauhan
*Assistant Examiner* — Sultana M Zalalee
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes projecting a first simulated ray from a moveable character within an interactive virtual environment to intersect one or more virtual surfaces represented in the environment. The method also includes rendering a graphical representation of the first simulated ray to identify the absence of an intersection with the one or more virtual surfaces represented in the interactive virtual environment.

24 Claims, 11 Drawing Sheets

QUALITY ASSURANCE TESTING OF VIRTUAL ENVIRONMENTS

TECHNICAL FIELD

This document relates to quality testing for constructing virtual environments such as video game levels.

BACKGROUND

During construction of walls (or other types of surfaces) to develop a video game level, gaps and voids may be produced by walls that do not properly intersect. For quality assurance, processes may be executed to check the level and identify such imperfections and take correction action (e.g., adjust wall position and orientation for an appropriate fit). By methodically "rubbing" a game character against each and every simulated wall, gaps may be visually detected if a portion of the game character or if the entire character falls into such a void. By executing such testing, probability is reduced that a character may become embedded in a wall during game play and take away from the enjoyment of the game experience.

SUMMARY

The systems and techniques described here relate to projecting simulated rays from a game character to perform quality assurance testing of virtual environments under development.

In one aspect, a computer-implemented method includes projecting a first simulated ray from a moveable character within an interactive virtual environment to intersect one or more virtual surfaces represented in the environment. The method also includes rendering a graphical representation of the first simulated ray to identify the absence of an intersection with the one or more virtual surfaces represented in the interactive virtual environment.

Implementations may include any or all of the following features. The method may further include rendering a representation of a geometrical shape to identify a point of incidence that represents the intersection of the first simulated ray and one of the one or more virtual surfaces represented in the interactive virtual environment. The rendered representation of the geometrical shape may represent the first simulated ray intersecting with a layer that defines physical properties of the one or more virtual surfaces. The rendered representation of the geometrical shape may include a portion that indicates a separation between a layer that defines physical properties of the one or more virtual surfaces and a layer that defines aesthetic properties of the one or more virtual surfaces. The direction that the first simulated ray is projected from the moveable character may be controllable. Rendering the graphical representation of the first simulated ray may be based on the projected first simulated ray exceeding a predefined propagation distance threshold. The first simulated ray may be included in a collection of simulated rays projected from the movable character. The collection of simulated rays may be projected from the movable character in an omni-directional manner. The first simulated ray may be restricted to a predefined number of reflections upon the one or more virtual surfaces represented in the interactive virtual environment. The interactive virtual environment may be a portion of a video game title.

In another aspect, a computer-implemented method for quality assurance testing of an interactive virtual environment includes maneuvering a moveable character to inspect virtual surfaces that define the interactive virtual environment. The method also includes projecting simulated rays from the character to intersect with the virtual surfaces of the interactive virtual environment. The method also includes rendering a graphical representation of each simulated ray included in the projected simulated rays that propagates beyond the interactive virtual environment as defined by a predefined propagation distance threshold to indicate the absence of an intersection with at least one virtual surface represented in the interactive virtual environment. Each projected simulated ray that intersects one or more virtual surfaces included in the interactive virtual environment is not rendered. The method also includes rendering a representation of a geometrical shape for each projected simulated ray that intersects with at least one virtual surface included in the interactive virtual environment to identify a point of incidence.

In another aspect, a computer program product tangibly embodied in an information carrier and comprising instructions that when executed by a processor perform a method that includes projecting a first simulated ray from a moveable character within an interactive virtual environment to intersect one or more virtual surfaces represented in the environment. The method also includes rendering a graphical representation of the first simulated ray to identify the absence of an intersection with the one or more virtual surfaces represented in the interactive virtual environment.

Implementations may include any or all of the following features. Further instructions may be executed by the processor to perform a method that includes rendering a representation of a geometrical shape to identify a point of incidence that represents the intersection of the first simulated ray and one of the one or more virtual surfaces represented in the interactive virtual environment. The rendered representation of the geometrical shape may represent the first simulated ray intersecting with a layer that defines physical properties of the one or more virtual surfaces. The rendered representation of the geometrical shape may include a portion that indicates a separation between a layer that defines physical properties of the one or more virtual surfaces and a layer that defines aesthetic properties of the one or more virtual surfaces. The direction that the first simulated ray is projected from the moveable character may be controllable. Rendering the graphical representation of the first simulated ray may be based on the projected first simulated ray exceeding a predefined propagation distance threshold. The first simulated ray may be included in a collection of simulated rays projected from the movable character. The collection of simulated rays may be projected from the movable character in an omni-directional manner. The first simulated ray may be restricted to a predefined number of reflections upon the one or more virtual surfaces represented in the interactive virtual environment. The interactive virtual environment may be a portion of a video game title.

In another aspect, a computer program product tangibly embodied in an information carrier and comprising instructions that when executed by a processor perform a method for quality assurance testing of an interactive virtual environment. The method includes maneuvering a moveable character to inspect virtual surfaces that define the interactive virtual environment. The method may also include projecting simulated rays from the character to intersect with the virtual surfaces of the interactive virtual environment. The method may also include rendering a graphical representation of each simulated ray included in the projected simulated rays that propagates beyond the interactive virtual environment as defined by a predefined propagation distance threshold to indicate the absence of an intersection with at least one virtual surface represented in the interactive virtual environment. Each projected simulated ray that intersects one or more virtual surfaces included in the interactive virtual environment is not rendered. The method also includes rendering a representation of a geometrical shape for each projected simulated ray that intersects with at least one virtual surface included in the interactive virtual environment to identify a point of incidence.

In another aspect, a system includes a computing device that includes a memory configured to store instructions. The computing device also includes a processor configured to execute the instructions to perform a method that includes projecting a first simulated ray from a moveable character within an interactive virtual environment to intersect one or more virtual surfaces represented in the environment. The method also includes rendering a graphical representation of the first simulated ray to identify the absence of an intersection with the one or more virtual surfaces represented in the interactive virtual environment.

Implementations may include any or all of the following features. The processor may be further configured to execute the instructions to perform a method that includes rendering a representation of a geometrical shape to identify a point of incidence that represents the intersection of the first simulated ray and one of the one or more virtual surfaces represented in the interactive virtual environment. The rendered representation of the geometrical shape may represent the simulated ray intersecting with a layer that defines physical properties of the one or more virtual surfaces. The rendered representation of the geometrical shape may include a portion that indicates a separation between a layer that defines physical properties of the one or more virtual surfaces and a layer that defines aesthetic properties of the one or more virtual surfaces. The direction that the first simulated ray is projected from the moveable character may be controllable. The graphical representation of the first simulated ray may be based on the projected first simulated ray exceeding a predefined propagation distance threshold. The first simulated rays may be included in a collection of simulated rays projected from the movable character. The collection of simulated rays may be projected from the movable character in an omni-directional manner. The first simulated ray may be restricted to a predefined number of reflections upon the one or more virtual surfaces represented in the interactive virtual environment. The interactive virtual environment may be a portion of a video game title.

In another aspect, a system includes a computing device that includes a memory configured to store instructions. The computing device also includes a processor configured to execute the instructions to perform a method for quality assurance testing of an interactive virtual environment. The method includes maneuvering a moveable character to inspect virtual surfaces that define the interactive virtual environment. The method also includes projecting simulated rays from the character to intersect with the virtual surfaces of the interactive virtual environment. The method also includes rendering a graphical representation of each simulated ray included in the projected simulated rays that propagates beyond the interactive virtual environment as defined by a predefined propagation distance threshold to indicate the absence of an intersection with at least one virtual surface represented in the interactive virtual environment. Each projected simulated ray that intersects one or more virtual surfaces included in the interactive virtual environment is not rendered. The method also includes rendering a representation of a geometrical shape for each projected simulated ray that intersects with at least one virtual surface included in the interactive virtual environment to identify a point of incidence.

Details of one or more implementations are set forth in the accompanying drawings and the description below. Other features, aspects and advantages will be apparent from the description and drawings, and from the claims.

DETAILED DESCRIPTION

Figure 1:
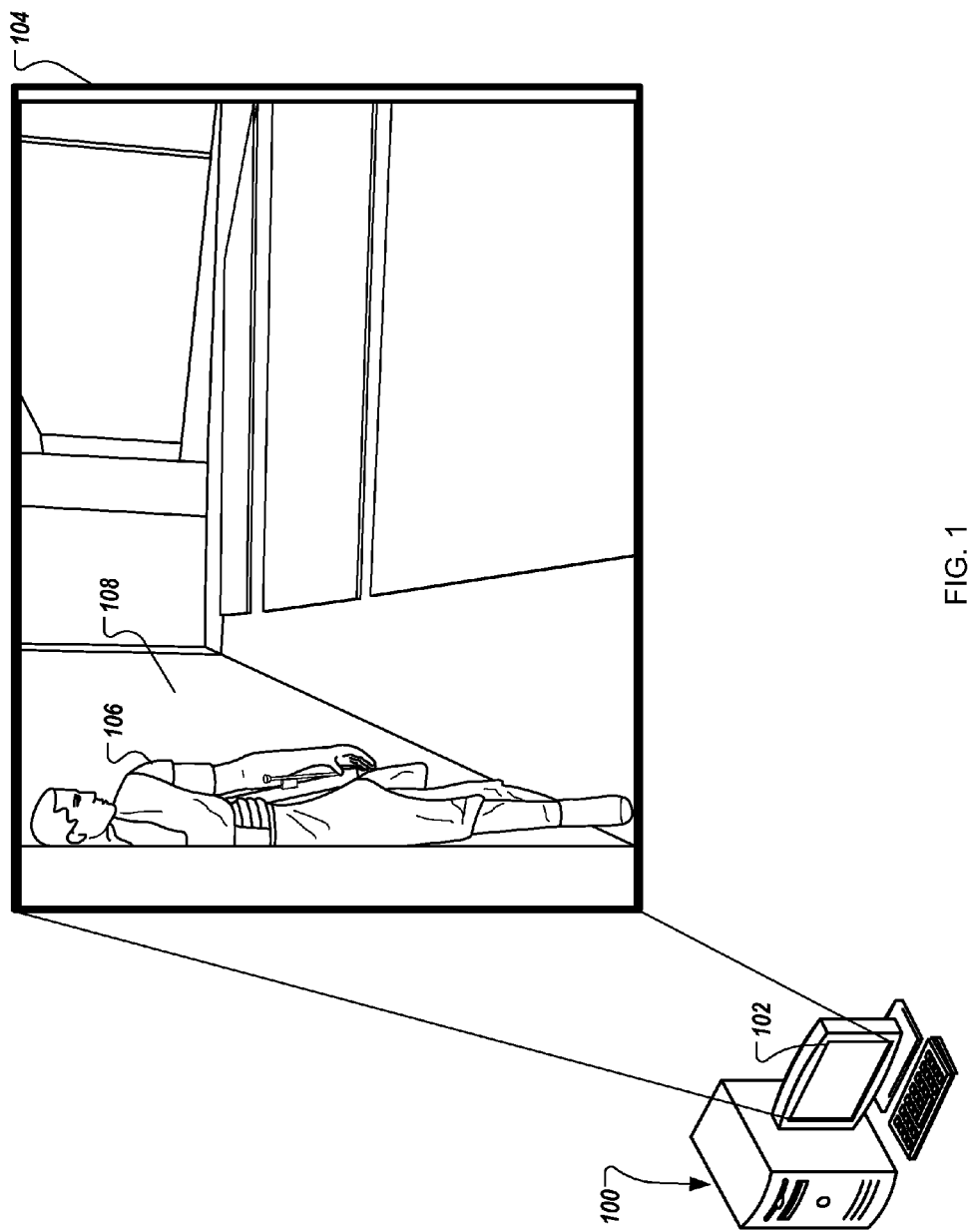
FIG. 1 illustrates an exemplary scene of a virtual environment.

Referring to FIG. 1, a computing device 100 (e.g., a computer system) is illustrated as presenting (on a display 102) a scene 104 from a virtual environment (e.g., a video game title) under development. Similar to other video games, the virtual environment is defined by virtual surfaces (e.g., walls, floor, ceilings, etc.) that a character can be moved (as directed by a user). In defining the surfaces and connecting them, gaps and voids may appear due to improper placement and orientation of the surfaces (e.g., a gap is formed between the separation of two wall surfaces). Often such situations occur when virtual surfaces and structures are imported from other game titles and development efforts. Such gaps may be relatively small and go unnoticed during construction of the virtual environment. However, while being maneuvered during game play, a character's movements may be hindered by such voids. For example, the character may be directed into a gap formed between two virtual walls and effectually "fall off" of the virtual environment or become stuck in the gap.

During a conventional quality assurance (Q/A) phase of game development, such surface openings can be detected by laboriously "rubbing" a game character of the virtual environment against each and every exposed virtual surface. Upon encountering an opening, the character or a portion of the character may appear embedded in the virtual surface or move through the gap and disappear from the view of a Q/A specialist. Referring to the scene 104, while being rubbed against each virtual surface, a character 106 detects an opening and appears to have become embedded in a wall 108. Noting the location of this opening, the appropriate virtual surface or surfaces may be adjusted to remove the detected gap (along with other identified gaps). While effective, this technique can be time consuming and relies upon the Q/A specialist to notice that the character has fallen into an opening in one or more of the virtual surfaces. This technique can also be considered monotonous and repetitive, thereby increasing the probability that a gap may be missed and go undetected. By not requiring a character to be methodically rubbed against each surface of a virtual environment, the time period needed for Q/A may be significantly reduced, thereby reducing the probability for error. Additionally, by allowing other operations to be executed in parallel with Q/A testing, development time may be further reduced for video game production.

One or more techniques and methodologies may be implemented to reduce Q/A time for detecting and identifying gaps and voids present in surfaces of a virtual environment. For example, simulated rays may be cast from a character while moving within the virtual environment (e.g., a video game level under development). By projecting such simulated rays, area coverage is increased for testing and the Q/A specialist does not need to focus on each virtual surface during testing. In some arrangements the simulated rays may be defined with properties similar to the game character. As such, the rays can interact (e.g., collide) with the virtual surfaces in manner similar to the game character. For example, rays may be defined to interact with virtual surfaces of size and scale that can also interact with a game character. A relatively large number of simulated rays (e.g., hundreds, thousands, etc.) may be projected from the character and collide with nearby surfaces (e.g., walls, floors, ceilings). For rays that do not collide with a surface and propagate a considerable distance, a determination may indicate that the ray has traveled through a gap or opening in a virtual surface. Based on the determination that an opening has been detected, the path of the ray can be further investigated to determine if corrective action is needed (e.g., adjusting the position and orientation of one or more virtual surfaces). Additionally, as rays are cast from the movable character, other operations may be executed in parallel to these Q/A operations (e.g., the character may be moved to test game play action within the virtual environment). As such, a game character projecting simulated rays can check the virtual surface integrity while reducing Q/A test time and improving video game development and production efficiency.

Figure 2:
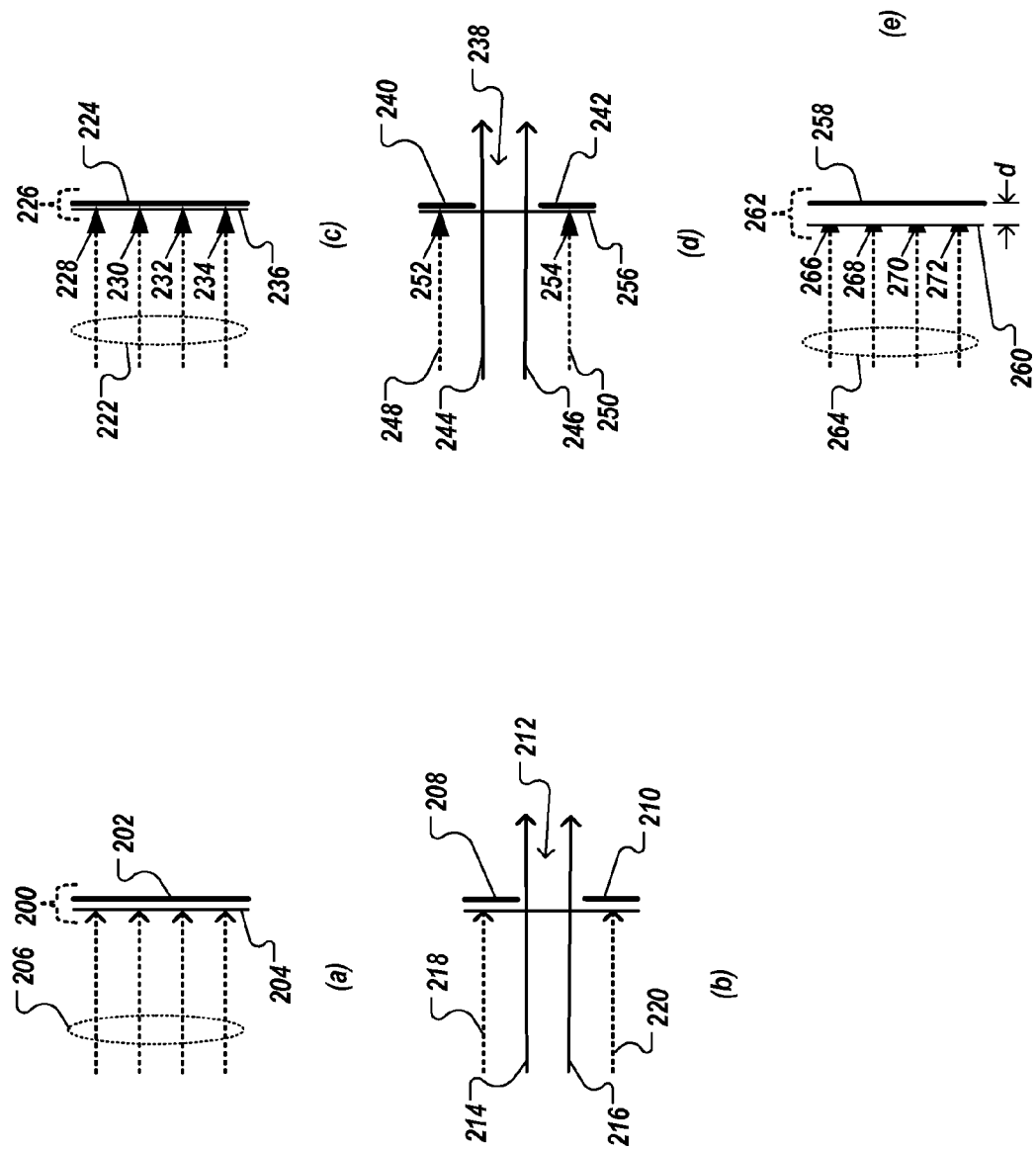
FIG. 2(a)-(e) illustrates simulated rays incident upon virtual surfaces.

Referring to FIG. 2, a series of illustrations represent simulated rays (projected from a character) being incident upon a surface (e.g., a wall) of a virtual environment. In this particular arrangement, as illustrated in FIG. 2(a), a surface 200 includes two virtual layers. While both layers are virtual and produced for the virtual environment (e.g., a video game level), each define different properties and parameters associated with the virtual surface 200. One layer, referred to as a physical layer 202 (and illustrated by a solid line), defines the physical qualities of the virtual surface 200. The physical layer 202 is generally not rendered for viewing and objects that collide with the layer may be stopped from further progress. Properties of the physical layer 202 can also be defined such that simulated rays incident upon the layer can be reflected (dependent upon the incident angle of the ray). Once reflected, the ray can continue to propagate from the point of reflection until colliding with another surface. As such, virtual surfaces (e.g., located at the end of a long virtual hallway) can be tested for Q/A prior to the character being nearby. Another layer used to define the virtual surface 200 is referred to as an art layer 204 and is illustrated with a relatively thin line. In general, the art layer represents aesthetics of the virtual surface, for example, the color, texture and material of the surface can be represented in the art layer. Not representing physical properties, progress of incident objects are not hindered by the art layer. As such, incident rays can propagate through an art layer. To appropriately simulate a structure (e.g., a wall), both the physical layer and art layer are typically positioned at equivalent locations (however for ease of the illustration shown in FIG. 2(a), the physical layer 202 and the art layer 204 are slightly separated to be visually distinguishable). In this example, the virtual surface 200 is continuous, and each incident ray (represented in a group by dashed circle 206) collides with the surface. Since each of the rays appropriately collide with the surface 200 (and detect no opening) none of the rays need to be rendered (e.g., assigned a viewable color), as illustrated with the dashed lines for each ray, to alert a Q/A specialist of a gap in the geometry of the surface.

Referring to FIG. 2(b), two physical layers 208, 210 of a surface are separated (not appropriately positioned) and create an opening 212. Absent a physical layer to collide with, incident rays are not blocked and continue to propagate beyond the surface. As such, the opening 212 is detected by the rays passing through the opening, and the rays are rendered (e.g., assigned a color) to alert the Q/A specialist. In this particular arrangement, rays 214, 216 are rendered (as represented by solid lines) while rays 218, 220, which respectively collide with the physical layers 208, 210, are not rendered and remain invisible to the Q/A specialist (as represented by the dashed lines). Along with rendering rays to indicate an opening, other graphical objects may be rendered to represent other information about virtual surfaces. For example, alignment differences between a physical layer and an art layer may be indicated by positioning graphical symbols at collision points. By rending a symbol (e.g., a three-dimensional pyramid) at the point a ray collides with the physical layer of a virtual surface, the Q/A specialist can visually identify if the art layer aligns with the physical layer and perform other types of inspections.

Referring to FIG. 2(c), a collection of rays (as highlighted in a group by a dashed circle 222) collide with a physical layer 224 of a virtual surface 226. None of the rays are rendered (as indicated by the dashed lines used to represent each of the rays) since each collides with the physical layer 224. However, at each point that a ray collides with the physical layer 224, a three-dimensional pyramid (e.g., pyramids 228, 230, 232, 234) is positioned. Other types of geometrical objects (e.g., cubes, spheres, two-dimensional objects, etc.) may also be used to identify collision points. The apex of each rendered pyramid intersects with the corresponding collision point of the associated ray. However, since only the art layer (and not the physical layer) is visual to a viewer, misalignments between art and physical layers are considerably noticeable by a viewer. As such layer alignment can be visually inspected in a relatively quick manner. In this example, since the physical layer 224 and an art layer 236 of the virtual surface 226 are properly aligned (a slight offset is added for distinguishing the two layers in the figure), the complete geometrical shape of each pyramid is rendered for the Q/A specialist. As such, a quick visual inspection shows that the layers of the surface 226 are substantially in alignment.

Referring to FIG. 2(d), an opening 238 is created from the separation of two physical layers 240, 242 (similar to arrangement shown in FIG. 2(b)). Two rays 244, 246 continue to propagate due to the opening 238 and are rendered (as indicated by the solid lines assigned to the rays) to alert the Q/A specialist. Similar to FIG. 2(c), rays 248, 250 incident upon the respective physical layers 240, 242 properly collide with the layers are not rendered (and do not distract the Q/A specialist from noticing the rendered rays 244, 246). However, pyramids 252 and 254 are appropriately positioned at the collision points associated with each of the rays 248, 250. As such, along with being able to visually inspect alignment between physical and art layers, the distribution pattern of the pyramids may allow a Q/A specialist to detect one or more missing pyramids (e.g., an absent pyramid due to the opening 238). Similar to FIG. 2(c), the complete geometry of each of the pyramids 252, 254 is visible since art layer 256 substantially aligns with the physical layers 240, 242.

Referring to FIG. 2(e), misalignment of a physical layer 258 and an art layer 260 of a virtual surface 262 is illustrated. In this example, the misalignment of the two layers 258, 260 is represented by a separation distance "d". As such, rays incident upon the art layer 260 propagate through the layer and collide with the physical layer 258. However, since the art layer 260 defines the visual content of the virtual wall 262, objects located beyond the wall may not be rendered and visible to a viewer. As such, pyramids (or other geometrical shapes) used to define the location of collisions with the physical layer 258 may not be completely viewable if at all. In this example, due to the separation between the layers 258, 260, only portions of pyramids are visible that define collision locations. In particular, a group of four rays (highlighted by the dashed-line circle 264) propagate through the art layer 260 and collide with the physical layer 258. Pyramids 266, 268, 270, 272 respectively identify the collisions of a corresponding ray. However, based upon the separation between the layers, only a portion of each pyramid is viewable. So, along with allowing a Q/A specialist to quickly detect if a ray has not properly collided with a physical layer (e.g., due to an opening), the absence of a geometrical shape (or a portion of a shape) used to identify collision points may quickly alert the Q/A specialist to one or more misalignments.

Figure 3:
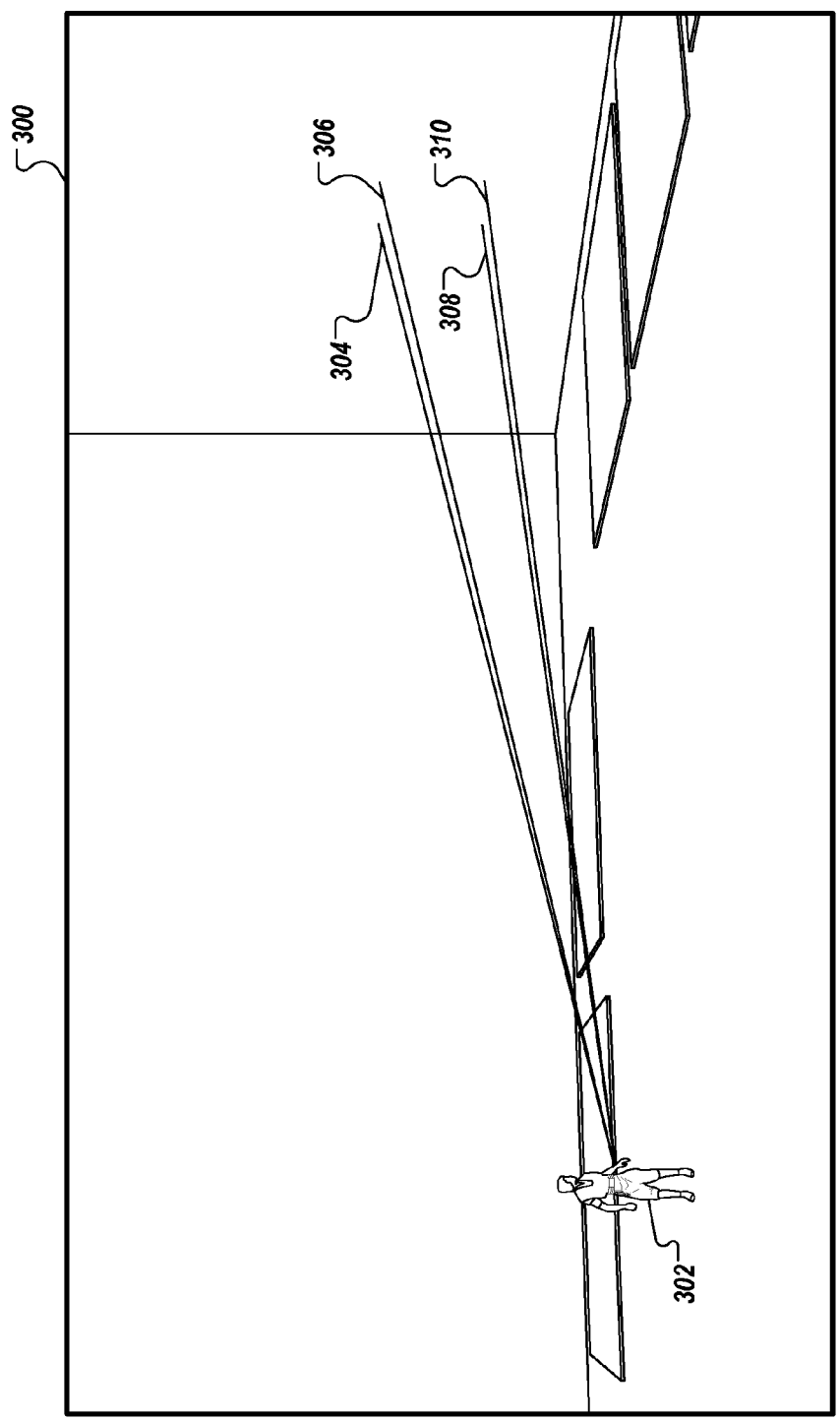
FIGS. 3-5 illustrate casting rays from a character into a scene of a virtual environment.

Referring to FIG. 3, a sample scene 300 from a video game level under development includes a game character 302 that projects simulated rays for Q/A testing of the virtual surfaces included in the scene. To quickly alert a Q/A specialist, a ray is rendered if it appears to propagate through an incident virtual surface. One or more techniques may be implemented to determine if a ray has propagated through a virtual surface (e.g., due to an opening in the geometry). For example, a threshold distance may be defined, and upon traveling past this distance, a ray may be considered as passing outside of the virtual environment under test. In this illustration, four rays have been rendered to indicate that each of the rays has propagated past such a predefined threshold distance. While a single threshold distance may be used for such determinations, multiple distances may be identified for Q/A testing. For example, one threshold may be used for particular portions of a virtual environment (e.g., interior rooms of a simulated structure) while another threshold may be used for other portions of the environment (e.g., locations external to the simulated structure).

Figure 4:
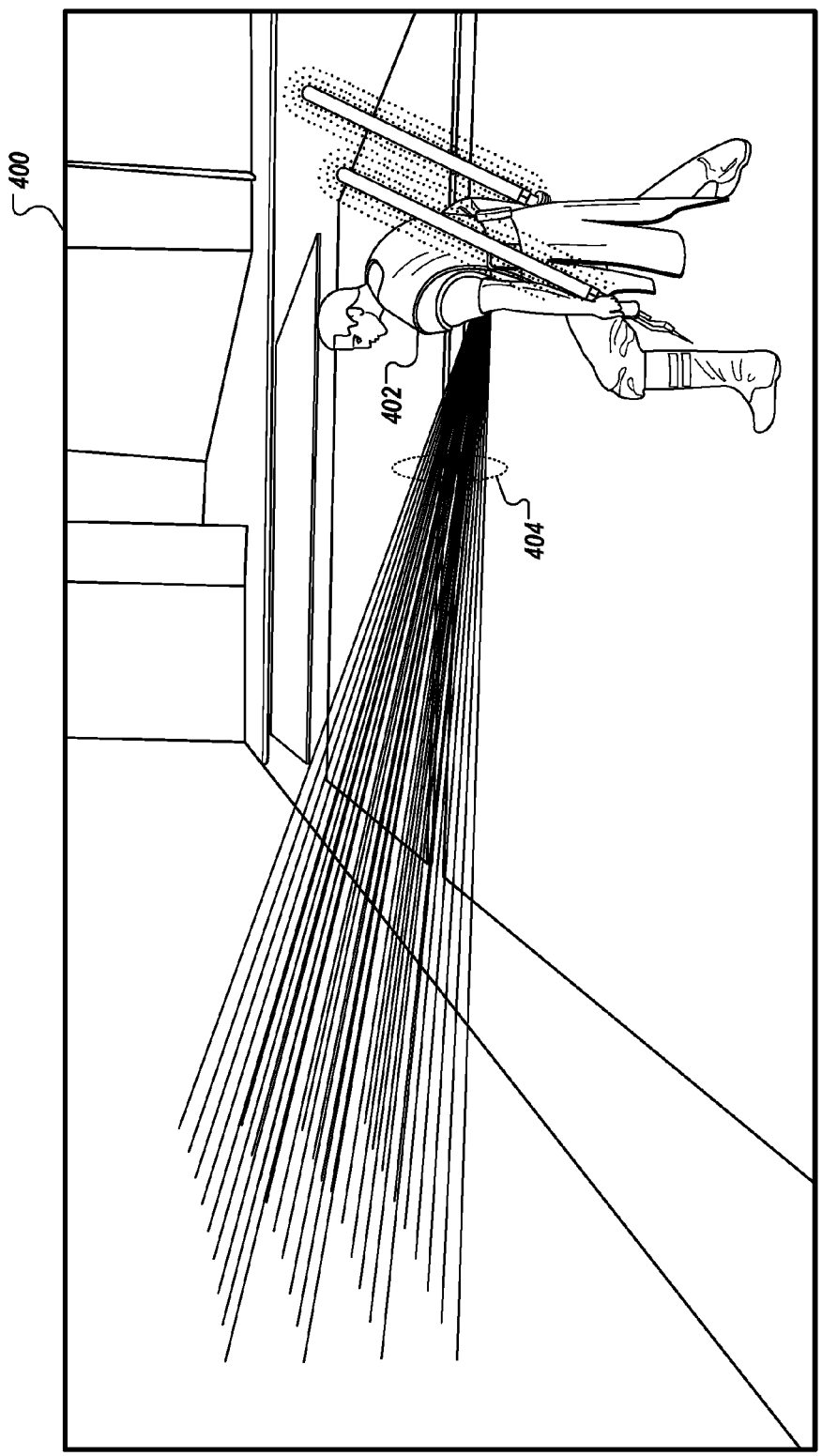

Referring to FIG. 4, upon detecting one or more openings or other types of surface abnormalities, the character may be maneuvered by the Q/A specialist to investigate the virtual surface in question. In this illustration of a virtual scene 400, a character 402 has been moved to a location in close proximity to a detected opening or openings (e.g., identified in FIG. 3) for further investigation. Being in closer proximity, additional simulated rays can be cast upon the portion of the surface wall with the one or more openings. As highlighted with dashed-line circle 404, the rendered rays indicate a larger concentration of rays (compared to the rendered rays shown in FIG. 3) propagate through the opening (or openings) to the predefined distance threshold. As such, correction action (e.g., adjusting virtual surfaces) is probably needed.

Figure 5:
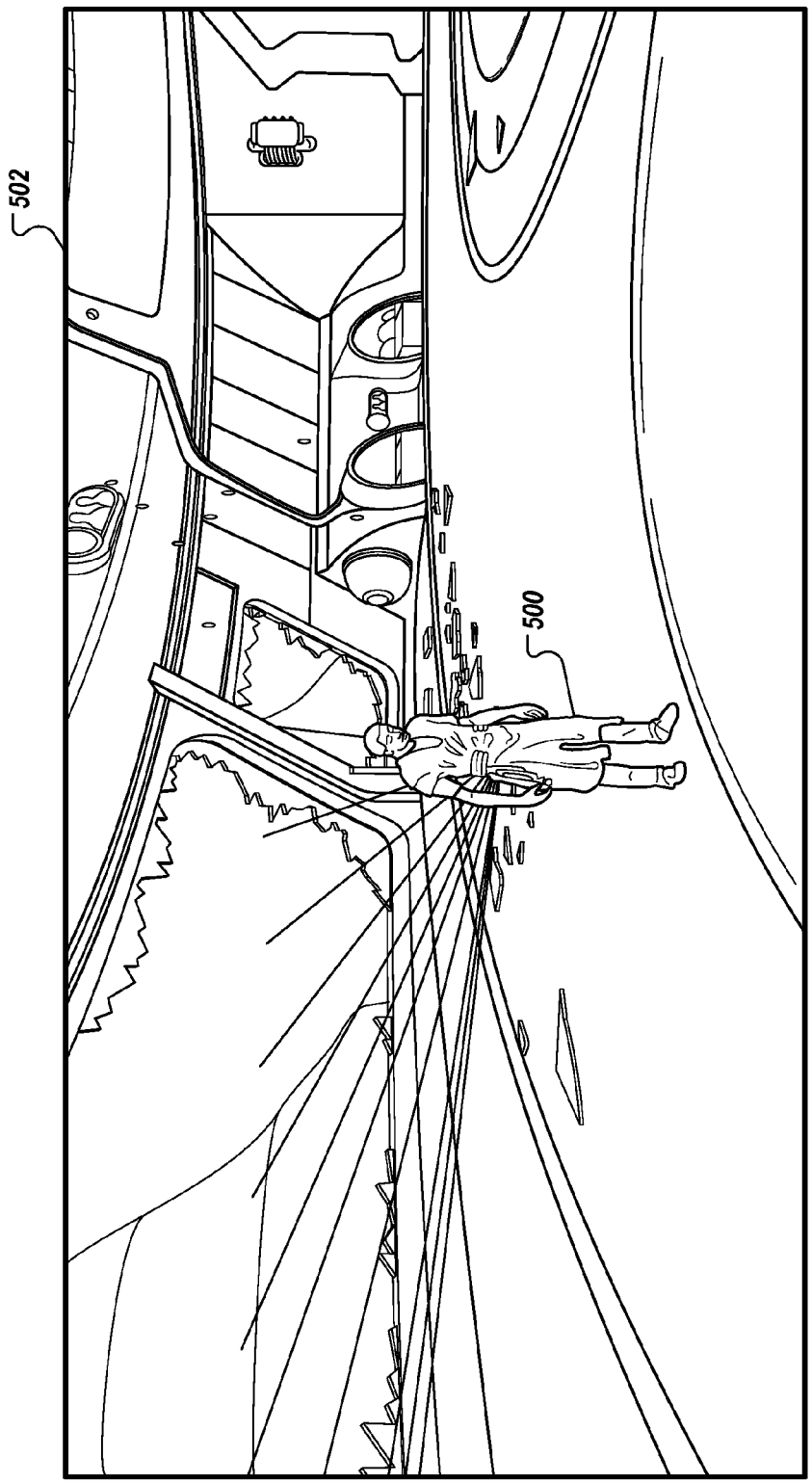

Referring to FIG. 5, another character 500 located in a virtual scene 502 is used as a source to project simulated rays. Similar to FIGS. 3 and 4, a collection of rays are rendered that propagate beyond the walls of the room represented in the virtual scene 502. In this particular illustration, the rendered rays propagate through two broken windows of the room. Similar, to the characters shown in FIGS. 3 and 4, rays are cast from the character 500 in an omni-directional manner. However, ray projection may be directional in some arrangements. For example, ray projection may be controlled in one or more particular directions (e.g., selected azimuth and elevation angles). Rays may be projected based upon particular look-up (e.g., positive elevation angles from the horizontal) and/or look-down (e.g., negative elevation angles from the horizontal) angles. The total number of projected rays along with the spatial distribution of the rays (e.g., more rays projected at positive elevation angles than negative elevation angles) may also be controlled. In some arrangements, rays may be allowed to reflect (e.g., bounce) from one surface collision point to another. By allowing such reflections, simulated rays may propagate throughout a virtual scene with less maneuvering (or none) of the character from which the rays are projected. As such, time needed to inspect a virtual scene may be reduced and thereby increasing efficiency of the Q/A phase of development. The number of reflections that a ray may experience may also be controlled. For example, by limiting reflections to a particular number, each associated ray may terminate upon reaching the maximum reflection number. As such, the Q/A specialist is less likely to be distracted or confused by one or a small number of rays being rendered that have reflected from many surfaces. Such a situation may actually hinder the identifying of the surface openings and misalignments. Other parameters associated with simulated rays may also be controlled. For example, the threshold distance that defines the maximum travel distance for the simulated rays may be controlled. Threshold distances may also be controlled in regards to particular directions associated with a virtual scene. For example, the threshold distance in the upward direction (e.g., z direction) above a character may be disabled since some virtual environments may be designed without having a ceiling surface or a physical layer included in the ceiling. As such, since many upward propagating rays would exceed any distance threshold, none of these upward directed rays would be rendered and potentially distract the user and hinder Q/A inspection. In some arrangements, a ceiling with a physical layer can be incorporated into the virtual scene or a portion of a ceiling can be incorporated (e.g., directly above the character) such that the upward propagated rays are reflected back into the virtual scene to possibly identify an opening associated with a virtual surface.

In the illustrated examples, rays are projected from a maneuverable character, however rays may be projected from one or more other types of objects or even different locations. For example, rather than one character, multiple maneuverable characters may be used to project simulated rays for Q/A inspection of surfaces included in a virtual environment. Furthermore, the simulated rays may be cast from one or more locations on a character (e.g., the center of the character, the character's head, the character's feet, etc.). Stationary characters or other types of virtual objects may also be used to provide a source for ray projection. For example, a series of virtual objects may be distributed throughout a virtual environment (or portions of an environment) for projecting rays to identify surface openings and misalignments. A Q/A specialist may then view different areas of the environment (e.g., from a controllable virtual camera) to detect abnormalities. In some arrangements, for any type of ray casting source, rendered rays and geometrical objects (representing collision points) may be stored for later retrieval and inspection. For example, rendered information from overnight testing may be stored for next-day inspection. Rays may also be projected from points along another propagating ray. For example, a ray that propagates along a considerably long corridor or hallway of a virtual environment may exceed the predefined distance threshold that indicates when a ray is considered to have exited the environment (and thereby be incorrectly rendered to alert the Q/A specialist). To address this scenario, one or more techniques may be implemented. For example, prior to reaching the distance threshold, one or more rays may be projected from the traveling ray in perpendicular directions. If one or more of these secondary rays collides with a relative nearby surface (e.g., as defined by another or the same distance threshold), a determination may be made that the initial ray is likely traveling down a corridor and need not be rendered. Other similar techniques may also be implemented for arriving at such a determination.

Figure 6:
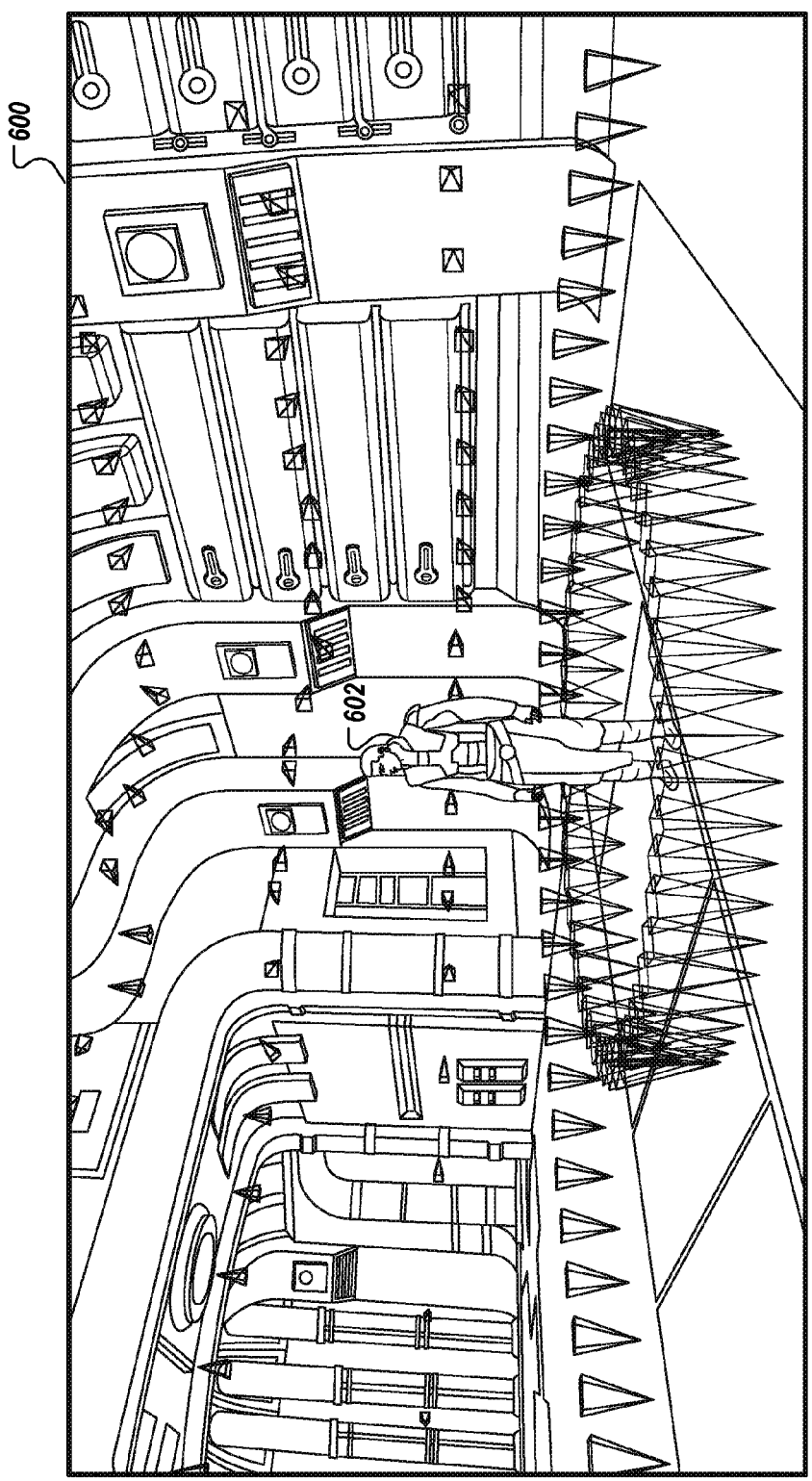
FIGS. 6-9 illustrate geometrical shapes representing collisions of simulated rays and virtual surfaces.

Referring to FIG. 6, another virtual environment 600 is presented in which geometrical shapes (e.g., pyramids) represent the collision points of simulated rays projected from a character 602. As illustrated the shapes are three-dimensional and form patterns (based on the distribution of the projected rays) such that surface misalignments can be relatively quickly identified by a Q/A specialist. In this particular example, complete geometries of nearly all of the pyramids have been rendered. As such, art and physical layers of the illustrated virtual surfaces are substantially in alignment. Along with using other geometrical shapes, various sizes, colors and shape orientations may be implemented to assist with surface misalignment detection.

Figure 7:
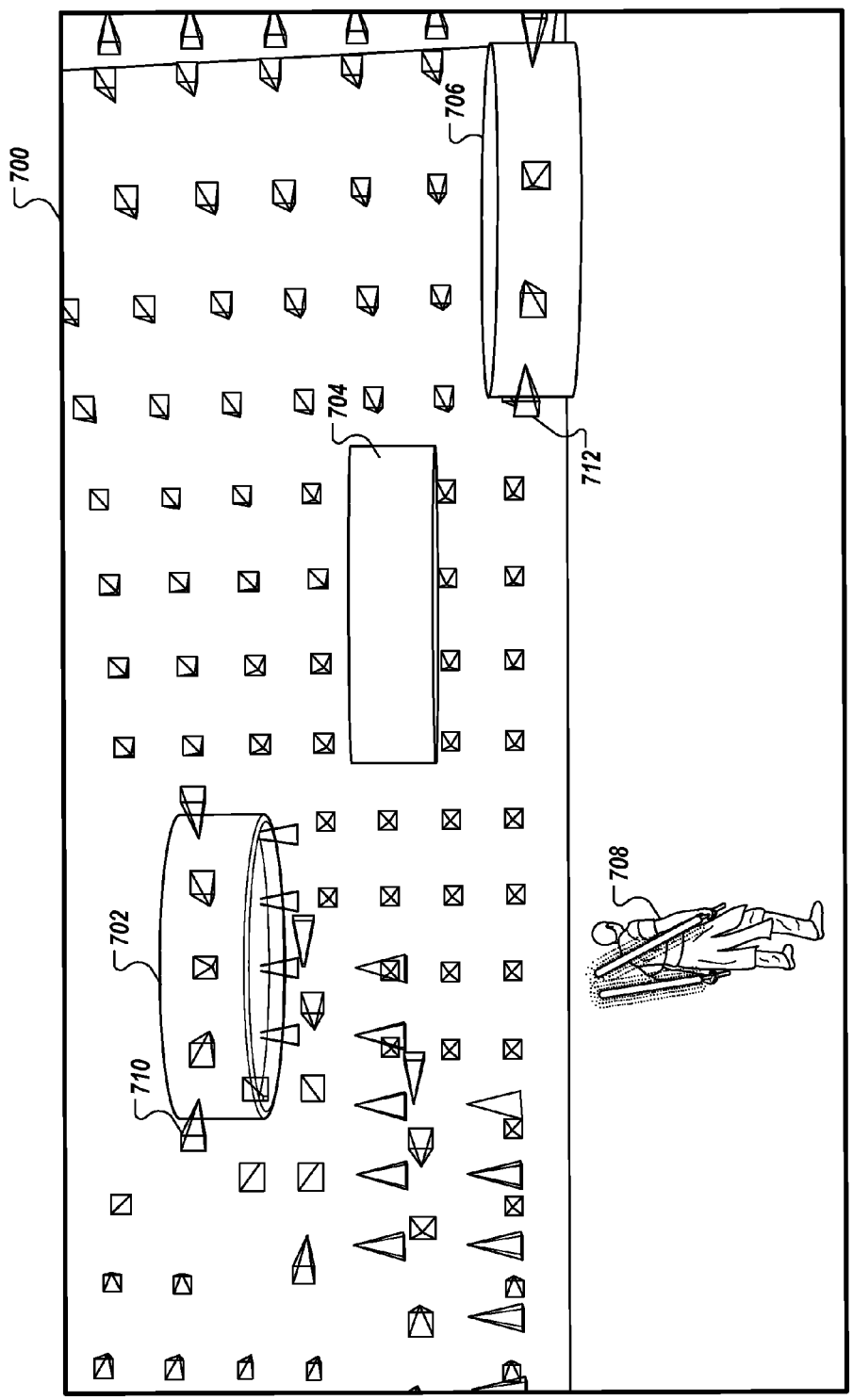

Referring to FIG. 7, another virtual environment 700 is illustrated in which a portion of the presented scene is not appropriately structured (e.g., a virtual surface does not include a physical layer). In this particular example, the scene includes three circular platforms 702, 704, 706 that may interact with by a game character 708 (e.g., the character may leap upon and walk across the top surface of the platforms). Similar to FIG. 6, simulated rays are projected from the character 708 in an omni-directional manner. Upon colliding with a physical layer of a virtual surface included in the environment 700, a geometrical shape (e.g., a pyramid) is rendered. In this example, along with the back wall surface of the environment 700, pyramids are rendered to indicate ray collision points on the circular platforms 702 and 706. For example, rendered pyramids 710, 712 alert a Q/A specialist that virtual surfaces of both circular platforms 702 and 706 include appropriately positioned physical layers. However, no rendered pyramids are rendered as being in contact with the circular platform 704. As such, the platform 704 does not include one or more properly positioned physical layers. The absence of rendered geometrical shapes can relatively quickly be noticed by a Q/A specialist and trigger further investigation of the suspect portion of the environment 700.

Referring to FIGS. 8(a) and (b), two perspective views of a virtual environment 800 are presented in which the environment includes three virtual wall units 802, 804, 806 that demonstrate physical and art layers being placed in different positions. To illustrate the differences, simulated rays are projected from a game character 808 that collide with physical layers of virtual surfaces of the wall units 802, 804, 806. Based on the positioning of the physical layers with respect to corresponding art layers, rendered geometrical shapes (that each represent a ray collision) may or may not properly align with the virtual surfaces. For example, a collection of rendered pyramids 810, which indicate collisions with ray wall unit 802, are not completely viewable and appear to be embedded in the wall unit. Based upon the appearance of the pyramids 810, a Q/A specialist can quickly determine that the physical layer of the virtual surface of the wall unit 802 is positioned behind to the art layer of the surface (e.g., as demonstrated in FIG. 2(e)). With respect to wall unit 804, a collection of pyramids 812 are similarly rendered to illustrate the collisions of projected rays (from the character 808). In this example, the apex of each pyramid in the collection 812 appears to intersect with the virtual surface of the wall unit 804. As such, the art and physical layers of the virtual surface of the wall unit 804 appear to be appropriately aligned and a Q/A specialist could make this determination from a quick visual inspection of the wall unit. Similarly, for wall unit 806, a collection of pyramids 814 are rendered to indicate ray collisions (as projected from the character 808) with the physical layer of the virtual surface of the wall unit. In this example, each of the rendered pyramids appears to be offset from the virtual surface of the wall unit 806. As such the physical layer of the surface is separated from the art layer and is positioned in front of the art layer (from the perspective of the character 808). As such, a quick visual inspection can quickly identify that the two layers are misaligned and corrective action (e.g., re-alignment of the layers) is needed.

Figure 8:
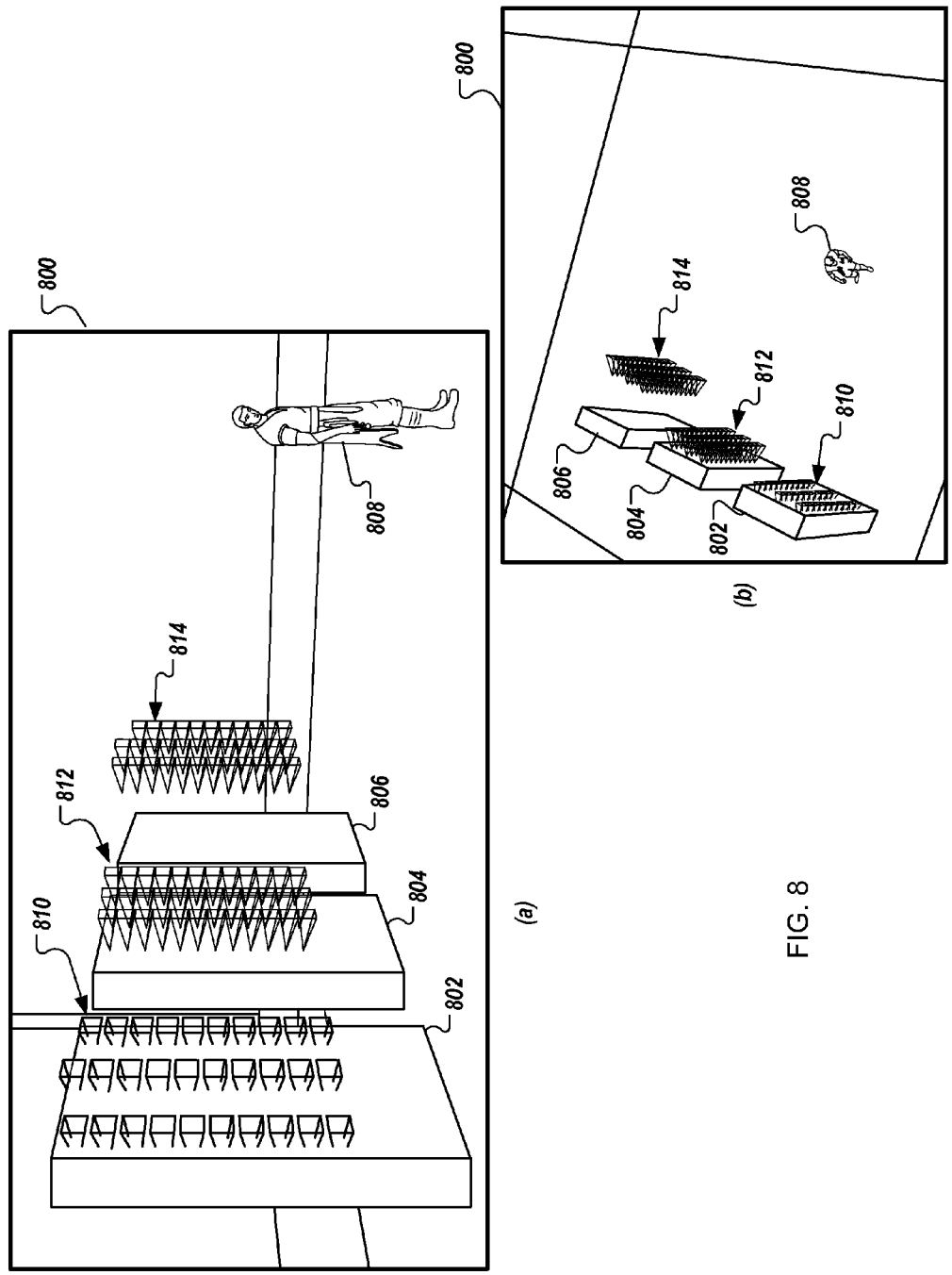
Figure 9:
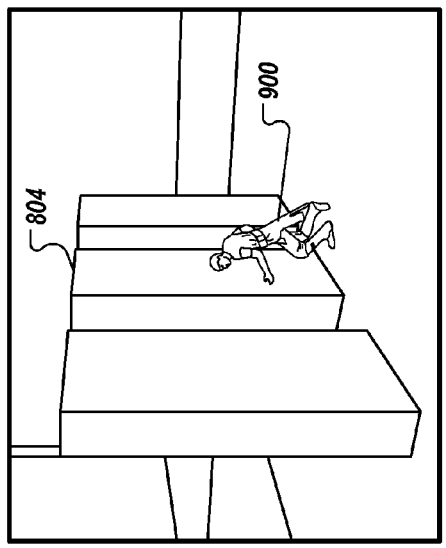
Figure 9:
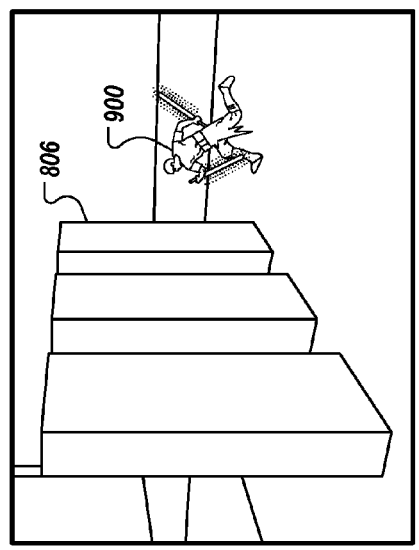
Figure 9:
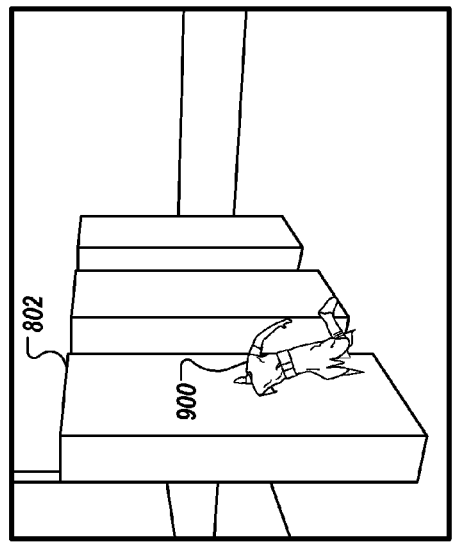

Referring to FIGS. 9(a), (b) and (c), a game character 900 is maneuvered for a Q/A inspection of the three wall units presented in FIGS. 8(a) and (b). In particular, the game character 900 is shown being maneuvered to inspect wall unit 802 in FIG. 9(a). Due to the misalignment of the physical and art layers of the virtual surface of wall unit 802, the character appears to enter the interior of the wall unit prior to colliding with the physical layer. In FIG. 9(b), the character 900 is moved to inspect wall unit 804 and is shown colliding with virtual surface of the wall unit (e.g., to demonstrate proper alignment of the art and physical layers). In FIG. 9 (c), the character 900 is shown colliding with the offset physical layer of a virtual surface of the wall unit 806. As such, the movement of the character 900 is halted prior to reaching the art layer of the virtual surface of the wall unit 802. While maneuvering of the character 900 detects similar construction defects, the time needed for such an inspection and efforts of a Q/A specialist are considerable compared to inspecting the same virtual environment as illustrated in FIG. 8.

Figure 10:
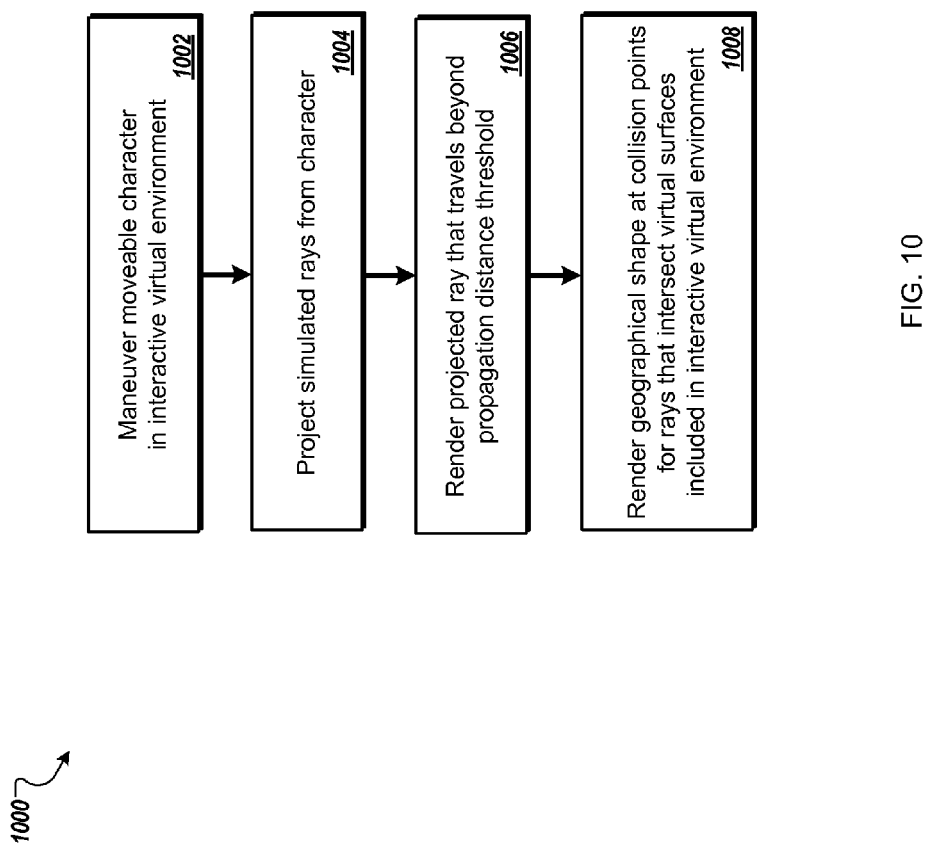
FIG. 10 is an exemplary flow chart of operations for testing virtual surfaces.

Referring to FIG. 10, a flowchart 1000 represents operations of a computing device such as the computer system 100 to perform Q/A operations on an interactive virtual environment such as a video game title. Such operations are typically executed by components (e.g., one or more processors) included in a computing device, however, operations may be executed by multiple computing devices. Along with being executed at a single site (e.g., at the location of the computer system 100), operations execution may be distributed among two or more locations.

Operations of the computing device may include maneuvering 1002 a moveable character in an interactive virtual environment (e.g., a video game title) for testing virtual surfaces included in the environment. For example, a Q/A specialist may interact with the computing device to move the character throughout a portion (e.g., a level) of the virtual environment) in a manner similar to game play. As the character is maneuvered, operations may include projecting 1004 simulated rays from the character (e.g., simulated rays may be cast from the head of the character). In some arrangements, the simulated rays may be cast in a continuous manner as the character is maneuvered, although the ray projection may also occur in at particular instances based on a particular transmission repetition rate. In still another arrangement, ray projection may be triggered by input received on the computing device from the Q/A specialist or another user. Once the simulated rays are projected, operations may include rendering 1006 graphical representations of each ray that travels beyond a distance threshold that defines a propagation distance considered to be outside the interactive virtual environment. As such, the rendered representation of the simulated ray alerts the Q/A specialist that the ray has traveled (e.g., through an opening in a surface represented in the virtual environment) beyond the environment and further investigation and possible corrective action may be needed. Operations may also include rendering 1008 a geographical shape (e.g., a pyramid) for each simulated ray that intersects (e.g., collides) with a virtual surface included in the virtual environment. By rendering a geometrical shape for each intersection point along with the simulated rays that exceed the distance threshold, and the Q/A specialist is provided an at-a-glance visual cue regarding possible Q/A issues (which can be quickly investigated) of the interactive virtual environment under development.

Figure 11:
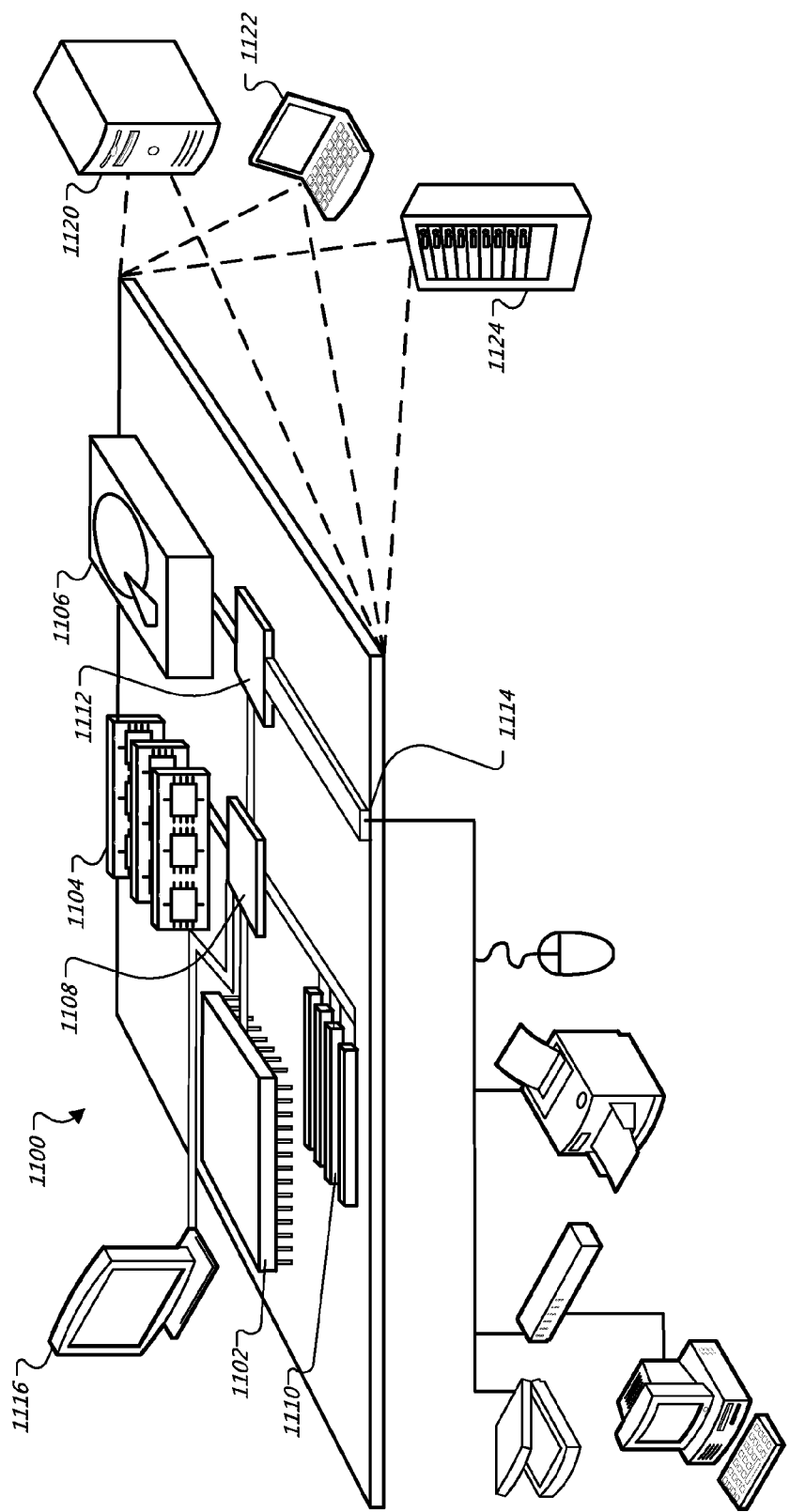
FIG. 11 is a block diagram of computing devices and systems.

FIG. 11 is a block diagram of computing devices that may be used and implemented to perform operations associated with quality assurance testing of interactive virtual environments (e.g., video game titles). Computing device 1100 can also represent various forms of digital computers, such as laptops, desktops, workstations, personal digital assistants, servers, blade servers, mainframes, and other appropriate computers.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses can be used, as appropriate, along with multiple memories and types of memory. Also, multiple computing devices 1100 can be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, memory on processor 1102, or the like.

The high speed controller 1108 manages bandwidth-intensive operations for the computing device 1100, while the low speed controller 1112 manages lower bandwidth-intensive operations. Such allocation of duties is exemplary only. In one implementation, the high-speed controller 1108 is coupled to memory 1104, display 1116 (e.g., through a graphics processor or accelerator), and to high-speed expansion ports 1110, which can accept various expansion cards (not shown). In the implementation, low-speed controller 1112 is coupled to storage device 1106 and low-speed expansion port 1114. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. It can also be implemented as part of a rack server system 1124. In addition, it can be implemented in a personal computer such as a laptop computer 1122. Alternatively, components from computing device 1100 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   projecting a plurality of simulated rays from a moveable character within an interactive virtual environment to intersect one or more virtual surfaces represented in the environment;
   identifying an absence of an intersection of a first simulated ray with the one or more virtual surfaces represented in the interactive virtual environment, the absence of the intersection being identified based on the first simulated ray exceeding a predefined propagation distance threshold;
   rendering a graphical representation of the first simulated ray to indicate a defect in the interactive virtual environment based on the identified absence of the intersection of the first simulated ray with the one or more virtual surfaces, the graphical representation of the first simulated ray being rendered in response to the first simulated ray exceeding the predefined propagation distance threshold, wherein a projected simulated ray that intersects a virtual surface represented in the interactive virtual environment is not rendered; and
   rendering a representation of a geometrical shape to identify a point of incidence that represents an intersection of a second simulated ray and one of the one or more virtual surfaces represented in the interactive virtual environment, wherein the rendered representation of the geometrical shape includes a portion that indicates a separation between a layer that defines physical properties of the one or more virtual surfaces and a layer that defines aesthetic properties of the one or more virtual surfaces.

2. The computer-implemented method of claim 1, in which the rendered representation of the geometrical shape represents the second simulated ray intersecting with the layer that defines physical properties of the one or more virtual surfaces.

3. The computer-implemented method of claim 1, in which a direction that the first simulated ray is projected from the moveable character is controllable.

4. The computer-implemented method of claim 1, in which the plurality of simulated rays are projected from a movable character.

5. The computer-implemented method of claim 4, in which the plurality of simulated rays are projected from the movable character in an omni-directional manner.

6. The computer-implemented method of claim 1, in which the first simulated ray is restricted to a predefined number of reflections upon the one or more virtual surfaces represented in the interactive virtual environment.

7. The computer-implemented method of claim 1, in which the interactive virtual environment is a portion of a video game title.

8. A computer-implemented method for quality assurance testing of an interactive virtual environment, comprising:

maneuvering a moveable character to inspect virtual surfaces that define the interactive virtual environment;

projecting simulated rays from the character to intersect with the virtual surfaces of the interactive virtual environment;

rendering a graphical representation of each simulated ray included in the projected simulated rays that propagates beyond the interactive virtual environment as defined by a predefined propagation distance threshold to indicate an absence of an intersection with at least one virtual surface represented in the interactive virtual environment, the absence of the intersection indicating a defect in the interactive virtual environment, wherein each projected simulated ray that intersects one or more virtual surfaces included in the interactive virtual environment is not rendered; and rendering a representation of a geometrical shape for each projected simulated ray that intersects with at least one virtual surface included in the interactive virtual environment to identify a point of incidence, wherein the rendered representation of the geometrical shape includes a portion that indicates a separation between a layer that defines physical properties of the one or more virtual surfaces and a layer that defines aesthetic properties of the one or more virtual surfaces.

9. A computer program product tangibly embodied in a non-transitory information carrier and comprising instructions that when executed by a processor perform a method comprising:

projecting a plurality of simulated rays from a moveable character within an interactive virtual environment to intersect one or more virtual surfaces represented in the environment;

identifying an absence of an intersection of a first simulated ray with the one or more virtual surfaces represented in the interactive virtual environment, the absence of the intersection being identified based on the first simulated ray exceeding a predefined propagation distance threshold; and rendering a graphical representation of the first simulated ray to indicate a defect in the interactive virtual environment based on the identified absence of the intersection of the first simulated ray with the one or more virtual surfaces, the graphical representation of the first simulated ray being rendered in response to the first simulated ray exceeding the predefined propagation distance threshold, wherein a projected simulated ray that intersects a virtual surface represented in the interactive virtual environment is not rendered; and rendering a representation of a geometrical shape to identify a point of incidence that represents an intersection of a second simulated ray and one of the one or more virtual surfaces represented in the interactive virtual environment, wherein the rendered representation of the geometrical shape includes a portion that indicates a separation between a layer that defines physical properties of the one or more virtual surfaces and a layer that defines aesthetic properties of the one or more virtual surfaces.

10. The computer program product of claim 9, in which the rendered representation of the geometrical shape represents the second simulated ray intersecting with the layer that defines physical properties of the one or more virtual surfaces.

11. The computer program product of claim 9, in which a direction that the first simulated ray is projected from the moveable character is controllable.

12. The computer program product of claim 9, in which the plurality of simulated rays are projected from a movable character.

13. The computer program product of claim 12, in which the plurality of simulated rays are projected from the movable character in an omni-directional manner.

14. The computer program product of claim 9, in which the first simulated ray is restricted to a predefined number of reflections upon the one or more virtual surfaces represented in the interactive virtual environment.

15. The computer program product of claim 9, in which the interactive virtual environment is a portion of a video game title.

16. A computer program product tangibly embodied in a non-transitory information carrier and comprising instructions that when executed by a processor perform a method for quality assurance testing of an interactive virtual environment, the method comprising:

maneuvering a moveable character to inspect virtual surfaces that define the interactive virtual environment;

projecting simulated rays from the character to intersect with the virtual surfaces of the interactive virtual environment;

rendering a graphical representation of each simulated ray included in the projected simulated rays that propagates beyond the interactive virtual environment as defined by a predefined propagation distance threshold to indicate an absence of an intersection with at least one virtual surface represented in the interactive virtual environment, the absence of the intersection indicating a defect in the interactive virtual environment, wherein each projected simulated ray that intersects one or more virtual surfaces included in the interactive virtual environment is not rendered; and rendering a representation of a geometrical shape for each projected simulated ray that intersects with at least one virtual surface included in the interactive virtual environment to identify a point of incidence, wherein the rendered representation of the geometrical shape includes a portion that indicates a separation between a layer that defines physical properties of the one or more virtual surfaces and a layer that defines aesthetic properties of the one or more virtual surfaces.

17. A computing device comprising:

a memory configured to store instructions; and a processor configured to execute the instructions to perform a method comprising:

projecting a plurality of simulated rays from a moveable character within an interactive virtual environment to intersect one or more virtual surfaces represented in the environment;

identifying an absence of an intersection of a first simulated ray with the one or more virtual surfaces represented in the interactive virtual environment, the absence of the intersection being identified based on the first simulated ray exceeding a predefined propagation distance threshold; and rendering a graphical representation of the first simulated ray to indicate a defect in the interactive virtual environment based on the identified absence of the intersection of the first simulated ray with the one or more virtual surfaces, the graphical representation of the first simulated ray being rendered in response to the first simulated ray exceeding the predefined propagation distance threshold, wherein a projected simulated ray that intersects a virtual surface represented in the interactive virtual environment is not rendered; and rendering a representation of a geometrical shape to identify a point of incidence that represents an intersection of a second simulated ray and one of the one or more virtual surfaces represented in the interactive virtual environment, wherein the rendered representation of the geometrical shape includes a portion that indicates a separation between a layer that defines physical properties of the one or more virtual surfaces and a layer that defines aesthetic properties of the one or more virtual surfaces.

18. The computer program product of claim 17, in which the rendered representation of the geometrical shape represents the second simulated ray intersecting with the layer that defines physical properties of the one or more virtual surfaces.

19. The computing device of claim 17, in which a direction that the first simulated ray is projected from the moveable character are controllable.

20. The computing device of claim 17, in which the plurality of simulated rays are projected from a movable character.

21. The computing device of claim 17, in which the plurality of simulated rays are projected from the movable character in an omni-directional manner.

22. The computing device of claim 17, in which the first simulated ray is restricted to a predefined number of reflections upon the one or more virtual surfaces represented in the interactive virtual environment.

23. The computing device of claim 17, in which the interactive virtual environment is a portion of a video game title.

24. A computing device comprising:
a memory configured to store instructions; and
a processor configured to execute the instructions to perform a method for quality assurance testing of an interactive virtual environment, the method comprising:
maneuvering a moveable character to inspect virtual surfaces that define the interactive virtual environment;
projecting simulated rays from the character to intersect with the virtual surfaces of the interactive virtual environment;
rendering a graphical representation of each simulated ray included in the projected simulated rays that propagates beyond the interactive virtual environment as defined by a predefined propagation distance threshold to indicate an absence of an intersection with at least one virtual surface represented in the interactive virtual environment, the absence of the intersection indicating a defect in the interactive virtual environment, wherein each projected simulated ray that intersects one or more virtual surfaces included in the interactive virtual environment is not rendered; and
rendering a representation of a geometrical shape for each projected simulated ray that intersects with at least one virtual surface included in the interactive virtual environment to identify a point of incidence, wherein the rendered representation of the geometrical shape includes a portion that indicates a separation between a layer that defines physical properties of the one or more virtual surfaces and a layer that defines aesthetic properties of the one or more virtual surfaces.

* * * * *